(12) United States Patent
Moriarty

(10) Patent No.: US 6,473,657 B1
(45) Date of Patent: Oct. 29, 2002

(54) ADAPTIVE MOTION CONTROLLER

(75) Inventor: Kevin Moriarty, Hampden, MA (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/558,021

(22) Filed: Apr. 25, 2000

(51) Int. Cl.$^7$ .............................................. G05B 13/02
(52) U.S. Cl. .............................. 700/28; 700/37; 700/39; 700/44; 700/45; 700/170; 700/193; 318/560; 318/561; 318/696; 318/700; 369/111; 369/46.28; 369/44.26; 369/47.49; 388/800; 388/805; 388/815; 388/911
(58) Field of Search .............................. 700/28, 31, 32, 700/33, 34, 37–39, 44–46, 170–174, 54–63, 69, 185–193; 318/66, 560, 561, 603, 636, 163, 254, 268, 432, 696, 700, 799; 369/111, 44.28, 44.29, 47.49, 44.26; 388/800–805, 911, 815

(56) References Cited

U.S. PATENT DOCUMENTS

| | | | | |
|---|---|---|---|---|
| 4,341,986 A | * | 7/1982 | Browder | 318/561 |
| 4,417,141 A | * | 11/1983 | Phillips | 250/231.14 |
| 4,855,661 A | * | 8/1989 | Okamoto et al. | 318/800 |
| 5,585,709 A | * | 12/1996 | Jansen et al. | 318/720 |
| 5,798,626 A | * | 8/1998 | Liska et al. | 318/562 |
| 5,818,190 A | * | 10/1998 | Liska et al. | 318/560 |
| 6,208,497 B1 | * | 3/2001 | Seale et al. | 361/154 |
| 6,259,221 B1 | * | 7/2001 | Yutkowitz | 318/561 |
| 6,281,650 B1 | * | 8/2001 | Yutkowitz | 318/561 |
| 6,294,891 B1 | * | 9/2001 | McConnell et al. | 318/560 |

FOREIGN PATENT DOCUMENTS

DE    10113173 A1 * 10/2001 ............. H02P/7/00

OTHER PUBLICATIONS

US 2001/0043450 A1, Nov. 22, 2001, Seale et al., System and Method for Servo Control of Nonlinear Electromagnetic Actuators.*

* cited by examiner

Primary Examiner—Ramesh Patel
(74) Attorney, Agent, or Firm—Spencer T. Smith

(57) ABSTRACT

An adaptive motion controller for driving a servo motor. The adaptive motion controller has an amplifier including a voltage command which can be set at a voltage at which the amplifier will be operated, a frequency selector which can be set at a frequency at which the amplifier will be operated, a power supply having a current feedback, and a control for driving the servo motor in a test mode wherein the voltage command is set at a selected voltage, and the frequency selector is sequentially set with a series of different frequencies. The servo motor is operated at each frequency, and the frequency of the series of frequencies that has the lowest current feedback is determined and the frequency selector is set at that frequency when the amplifier is operated to drive the servo motor.

3 Claims, 2 Drawing Sheets

ADAPTIVE MOTION CONTROLLER

The present invention relates to motion controllers for driving a variety of servo motors.

BACKGROUND OF THE INVENTION

Motion controllers conventionally have an amplifier which is selected for its match to the servo motor. As a result different servo motors require different amplifiers and this means that any inventory of amplifiers for a number of servo motors will require a corresponding set of motion controllers.

OBJECT OF THE INVENTION

It is an object of the present invention to provide a motion controller which can be configured to optimally drive any servo motor to which it is connected.

BRIEF DESCRIPTION OF THE PREFERRED EMBODIMENT

Figure 1:
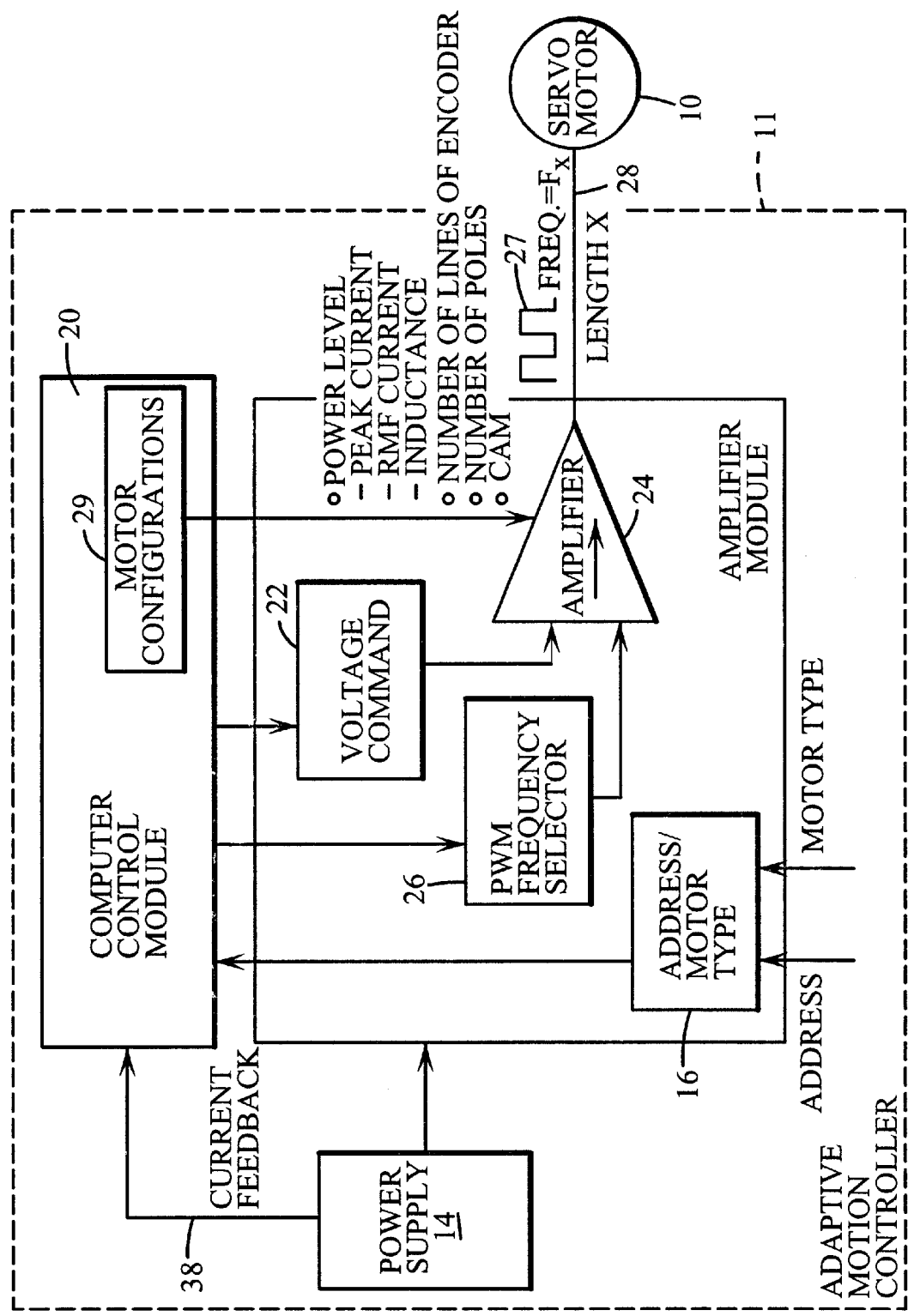
FIG. 1 is a schematic drawing of an adaptive motion controller made in accordance with the teachings of the present invention.

As illustrated in FIG. 1, a servo motor 10 is to be driven by an adaptive motion controller 11 which includes an amplifier module 12 powered by a power supply 14. The amplifier module includes a location 16 for receiving, storing and outputting address and motor type data which can be inputted in any suitable manner such as by locating a multi-position switch at a location representing the location of the amplifier module and by locating a multi-position switch at a location representing the motor type (both not shown).

The adaptive motion controller also includes a computer control module (CCM) 20 which will receive the stored information and deliver properly addressed data to the amplifier module. Specifically, the CCM, knowing the motor type will supply the amplifier with information for configuring the amplifier including the power level (peak current, the RMF (root mean square) current, and the inductance), the number of lines in the encoder, the number of poles and the cam or profile for the desired displacement. The CCM stores a number of Motor Configurations 29, one for each motor to be driven, and downloads the correct data to the amplifier module. The CCM also sends a signal to the PWM (pulse width modulation) Frequency Selector 26 to set the desired frequency to the amplifier.

The amplifier module, when built, is accordingly not configured for any servo motor, but, when dedicated by setting the address and motor type, and connected to the CCM will be automatically configured for that motor. The amplifier could, for example, be configured to drive a ½, 1, 2, 5, or 10 horsepower motor.

Figure 2:
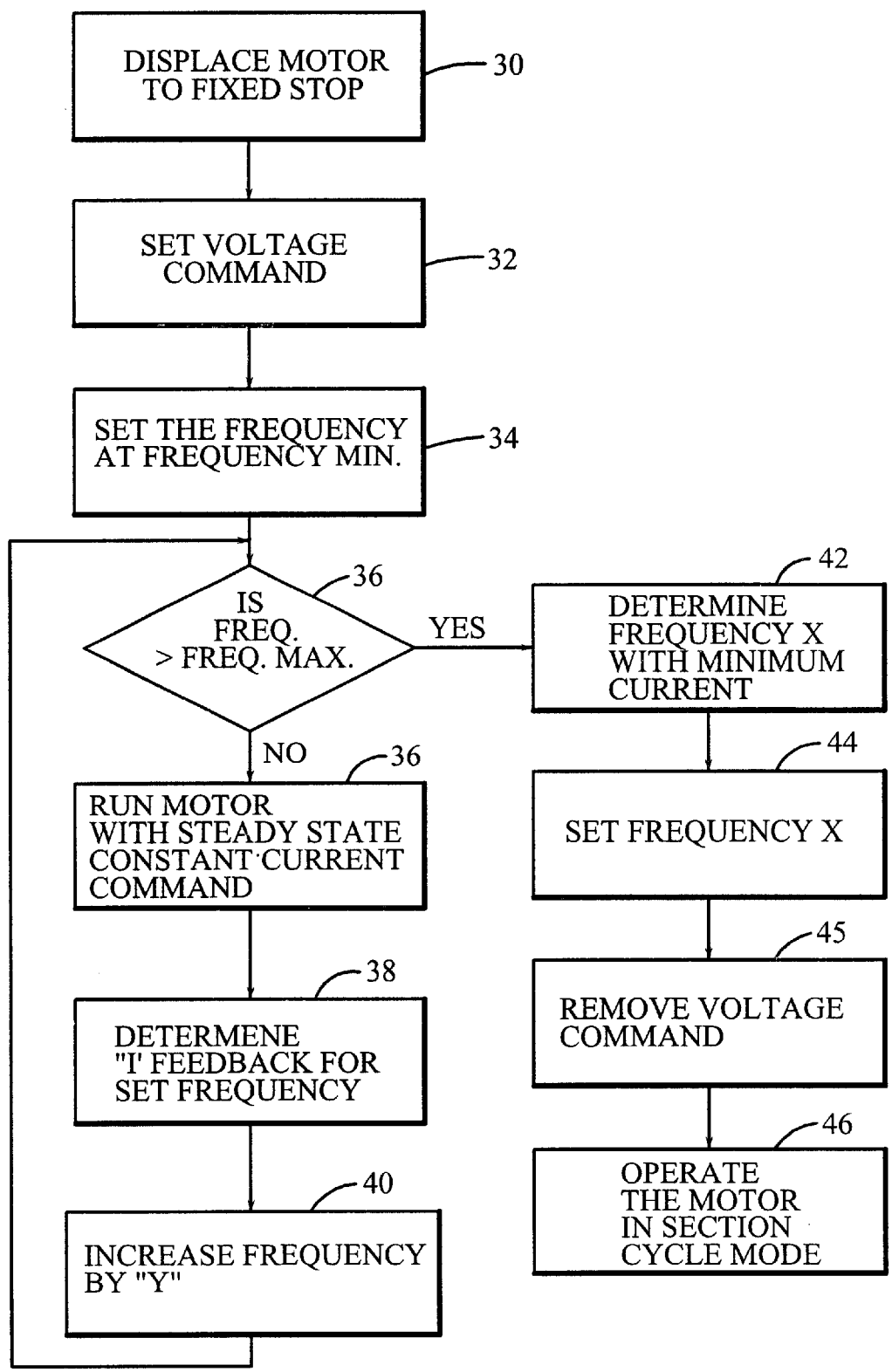
FIG. 2 is a control drawing illustrating the operation of a portion of the motion controller.

The output of the amplifier is a pulse width modulated wavelength frequency 27 (Fx) which is a function, in part, of the length X of the cables 28 connecting the amplifier to the servo motor and this frequency is selectively set. Referring to FIG. 2, the CCM operates the amplifier to run the motor (the mechanism that it is displacing) until it is located at a fixed stop (Displace Motor To Fixed Stop 30). The CCM is operated in a test mode to Set Voltage Command 32 in the Voltage Command 22 and to Set The Frequency At Frequency Minimum 34 in the PWM Frequency Selector 26 of the amplifier. If the frequency that is seen by the Is Frequency>Frequency Maximum 36 decision location, the CCM will Run Motor With Steady State Constant Current Command 36. The CCM will Determine the Current Feedback 38 from the Power Supply, then Increase Frequency By "Y" 40 and return to the decision block 36 where the process will be repeated until the set frequency is greater than the maximum frequency, whereupon the CCM will Determine Frequency X With Minimum Current 42 and finally Set Frequency X 44 in the Frequency Selector 26. The control will then Remove Voltage Command 45. While FIG. 2 illustrates one method by which current usage across the possible frequency range is determined, other approaches are well known. With the motor configured and with the frequency selected the CCM will then Operate The Motor In Section Cycle Mode 46.

What is claimed is:

1. An adaptive motion controller for driving a servo motor comprising an amplifier including
a voltage command which can be set at a voltage at which the amplifier will be operated,
a frequency selector which can be set at a frequency at which the amplifier will be operated,
a power supply having a current feedback, and
control means including means for driving the servo motor in a test mode including
means for setting said voltage command at a selected voltage,
means for sequentially setting said frequency selector with a series of different frequencies,
means for operating said servo motor at each frequency, and
means for determining which frequency of said series of frequencies has the lowest current feedback, and
wherein said control means further comprise means for driving the servo motor in a normal mode including means for setting said frequency selector at the frequency which has the lowest current feedback.

2. An adaptive motion controller for driving a servo motor according to claim 1, wherein the servo motor will be operating against a fixed stop when said control means is operating in the test mode.

3. An adaptive motion controller for driving a servo motor according to claim 2, wherein said means for driving the servo motor in a normal mode including means for removing the selected voltage from said voltage command.

* * * * *